May 21, 1940.  A. C. ZIMMERMAN  2,201,876
WATER SEEPAGE INTERCEPTOR
Filed Dec. 6, 1937  2 Sheets-Sheet 1
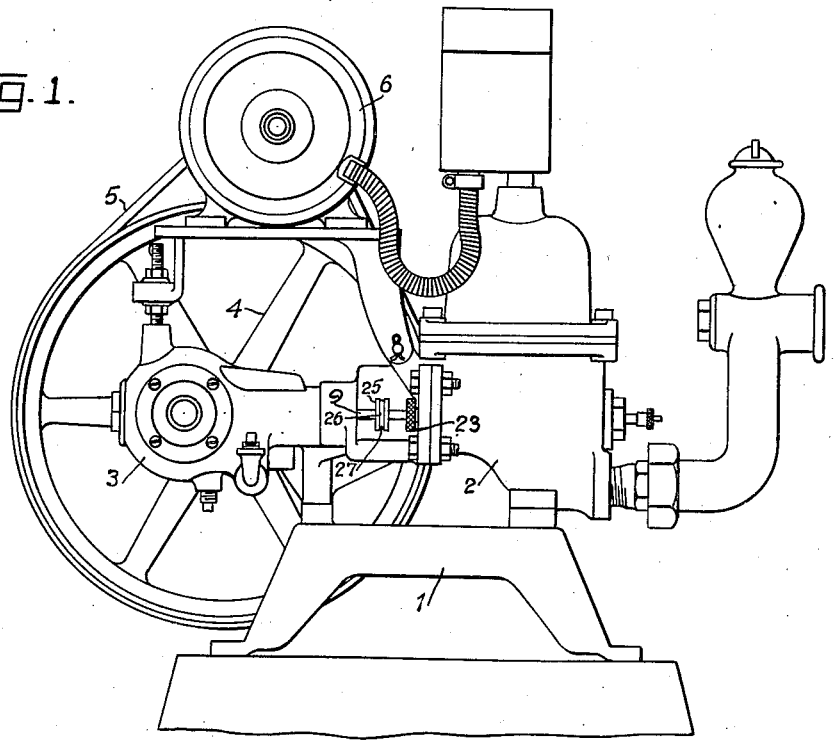
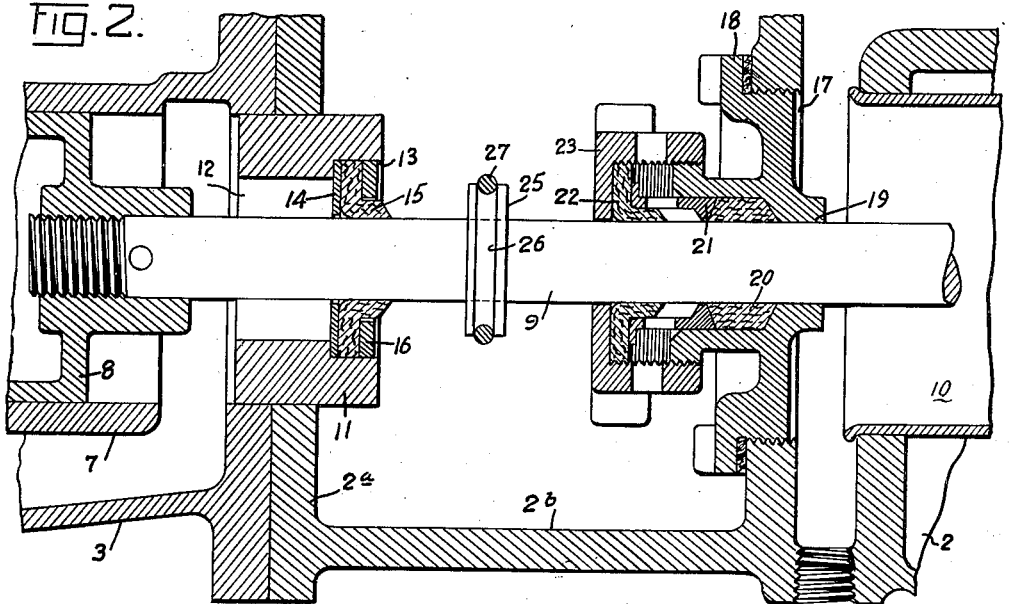
Inventor
ARTHUR C. ZIMMERMAN,
By Toulmin & Toulmin
Attorneys May 21, 1940.  A. C. ZIMMERMAN  2,201,876
WATER SEEPAGE INTERCEPTOR
Filed Dec. 6, 1937  2 Sheets-Sheet 2
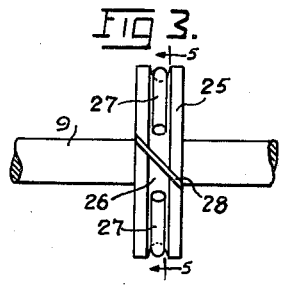
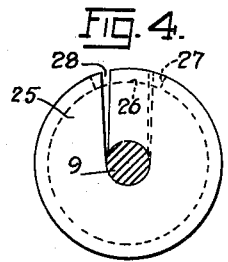
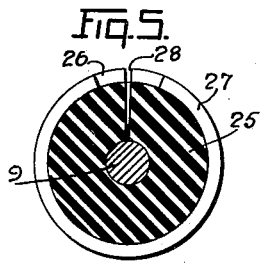
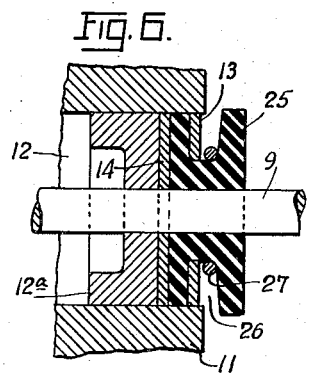
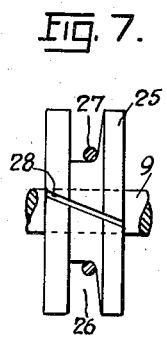
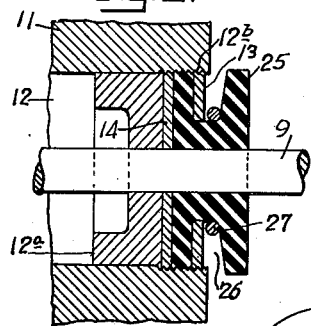
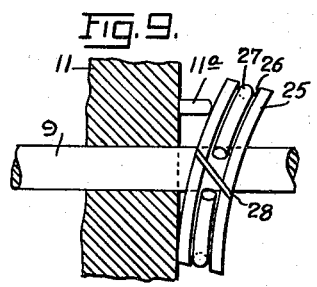
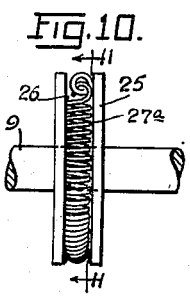
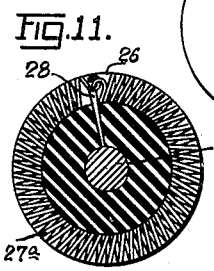
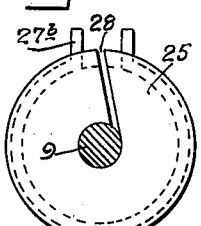
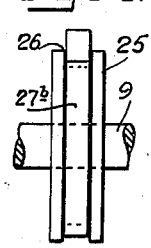
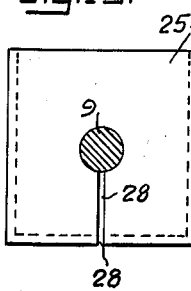
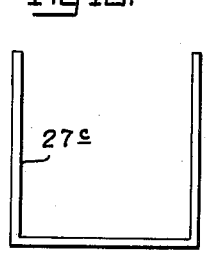
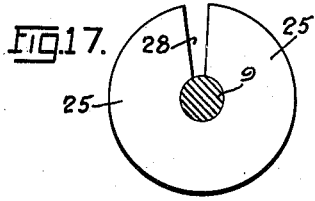
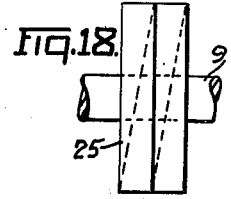
Inventor
ARTHUR C. ZIMMERMAN,
BY Toulmin & Toulmin
Attorneys Patented May 21, 1940

2,201,876

UNITED STATES PATENT OFFICE 2,201,876

WATER SEEPAGE INTERCEPTOR

Arthur C. Zimmerman, Dayton, Ohio, assignor to The Duro Company, Dayton, Ohio, a corporation of Ohio Application December 6, 1937, Serial No. 178,256

5 Claims. (Cl. 288—2)

This invention relates to pumps and in particular to seepage interceptors therefor.

It is an object of this invention to provide for a pump or other mechanism provided with a reciprocatory piston rod, a seepage interceptor adapted to be disposed thereon to prevent the travel of oil, water, or other fluids along the piston rod during its operation.

It is a further object of this invention to provide such a structure which is oil-proof.

It is a further object of this invention to provide such a seepage interceptor construction which may be readily and conveniently applied to the piston rod of an assembled pump after assemblage thereof.

It is a further object of this invention to provide such a construction wherein the dimensions thereof and the properties of the material from which it is constructed are such as resiliently to secure the interceptor upon the piston rod.

It is a further object of this invention to provide such a construction wherein a split disk or washer construction is utilized and wherein, in addition to the normal clamping force exerted upon the rod through the properties of the body material thereof, spring means is provided for increasing the tight, seep-proof engagement of the interceptor with the supporting piston rod.

It is a further object of this invention to provide such a construction wherein the interceptor member is resiliently maintained in close engagement with the supporting piston rod and capable of resiliently resisted axial movement thereon, whereby to accommodate the stroke of the pump, or piston rod, where the stroke is of greater length than the distance between the crankcase seal and the stuffing box or seal of the cylinder of a pump or the like.

It is a further object of this invention to provide interceptor means adapted for such close engagement with the piston rod of a pump as to prevent the passage thereby of oil from the crankcase or water from the pump cylinder to prevent destruction of the cup leather or other sealing means of the pump cylinder and to prevent dilution of the lubricant in the pump crankcase.

It is a further object of this invention to provide such a construction which is of cheap manufacture, which is easy to attach or remove and which is extremely efficient in operation.

These and other objects and advantages will appear from the following description taken in connection with the drawings.

In the drawings:

Figure 1 is a view, in side elevation, of a known pump equipped with seepage interceptor according to the principles of this invention;

Figure 2 is a fragmentary elevational view, in section, illustrating in detail the application of the interceptor to the piston rod of the pump;

Figure 3 is a fragmentary side elevational view of a piston rod equipped with one preferred form of interceptor;

Figure 4 is an end elevational view of the structure shown in Figure 3;

Figure 5 is a section taken on the line 5—5 of Figure 3;

Figure 6 is a fragmentary elevational view, in section, illustrating the attachment of the interceptor to a stationary guide plug in the pump crankcase;

Figure 7 is an elevational view similar to Figure 3 and illustrating the application of the interceptor to a portion of the piston rod between the pump cylinder and pump crankcase;

Figure 8 is a view similar to Figure 6, but illustrative of a modified means for securing the interceptor to the stationary guide plug in the pump crankcase;

Figure 9 is a side elevational view, partly in section, illustrating the means for utilizing, with a piston rod of given diameter, an interceptor structure having an aperature of greater diameter than the piston rod diameter;

Figure 10 is a view similar to Figure 7, but illustrating the use of garter spring means to maintain the interceptor in close engagement with a supporting piston rod;

Figure 11 is a section taken on the line 11—11 of Figure 10;

Figure 12 is a view similar to Figure 4, but showing a modified form of interceptor which is unprovided with slot means as illustrated in Figure 4;

Figure 13 is a view similar to Figure 4, but illustrating the application of a modified form of flat spring for maintaining close engagement between the interceptor and the supporting connecting rod;

Figure 14 is a side elevational view of the structure shown in Figure 13;

Figure 15 is a view similar to Figure 13, but illustrating the construction of the interceptor in rectangular form;

Figure 16 is a view similar to Figure 15, but illustrating a type of spring means particularly adapted for use with the structure shown in Figure 15;

Figure 17 is a view similar to Figure 13, but illustrating a modified form of interceptor wherein close engagement thereof with the supporting piston rod is secured through the inherent resiliency of the body material; and Figure 18 is a side elevational view of a modified form of interceptor which is formed as a spiral.

Referring to the drawings in detail and with reference particularly to Figures 1 and 2, the pump illustrated has a sub-base 1 to which is attached the cylinder casting or water box 2 and a crankcase 3 which are rigidly secured together. The crankcase is provided with suitable bearing means for supporting the crankshaft which has the flywheel 4 rigidly secured thereto. The flywheel 4 is suitably driven through the belt 5 by the motor 6. The crankcase 3 is provided with suitable guide means 7 in which is disposed the reciprocable crosshead 8. The crosshead 8 is reciprocated through rotation of the flywheel 4. Rigidly attached at one end to the crosshead 8 is the piston rod 9 which has its other end suitably secured to piston means adapted to be reciprocated thereby in the cylinder sleeve or liner 10 which is rigidly secured in the water box 2.

Rigidly secured in suitable manner in the crankcase casting 3 and extending through the connected flange 2a of the water box 2 is the guide plug 11 having an axial bore 12 substantially spaced from the piston rod 9 and having an annular recess 13 at its outer end in which is secured in any suitable manner as by drive fit the metallic washer member 14 which has disposed outwardly thereof the cup leather seal member 15 which is retained in the recess 13 by the retaining ring 16. The retaining ring 16 is rigidly secured in the recess 13 in any suitable manner as by means of drive fit.

The water box casting is provided with a threaded aperture 17 in which is screw-threadedly secured the stuffing box member 18. The stuffing box is provided with a suitable central aperture 19 adapted for close engagement with the piston rod 9 and, at its outer end, a suitable chamber is provided for receiving the packing 20 which is secured in position by the stuffing box follower 21 which is slidable in the chamber and which is provided with a suitable annular recess for receiving the inner end of the cup leather seal member 22 which is secured in position by the stuffing box nut 23 screw-threadedly attached to the stuffing box 18.

Suitable apertures are provided in the stuffing box nut 23, the stuffing box and the stuffing box follower 21 to allow drainage into the intermediate portion 2b of the water box 2, which portion 2b forms a drip pan or water pan for receiving such water. The above-described pump structure is merely illustrative of one form of pump to which the interceptor of my invention may be applied and it is, of course, to be understood that application thereof may be made to various of the reciprocatory piston rods or the like for the purpose of preventing the travel thereon of fluids and the like of various types. One form of interceptor is illustrated in Figure 1, wherein the body thereof, in the form of a disk, is designated 25. This interceptor comprises, as also shown in Figure 12, a circular disk of suitable material such as leather, rubber, oil-proof synthetic rubber, or rubber provided with a coating of synthetic or other oil-proofing material such as "Duprene," "Thiokol" or the like. It is, however, preferable that this member 25 be formed of rubber or other material possessed with like resiliency, and the disk 25 is provided with a central bore preferably slightly smaller than the supporting piston rod 9 in order that the inherent resiliency of the disk 25 may retain it firmly on the rod 9 in such manner as to prevent the passage of fluids along the shaft 9 past the disk 25 in either direction. Where the stroke of the rod 9 is greater than the distance between the stuffing box nut 23 and the end of the cup leather seal 15, the resiliency of the disk 25 permits it to be pushed along the rod 9 upon engagement of the disk 25 with either the stuffing box nut 23 or the end of the seal 15.

As shown in Figure 1, the disk 25 is provided with a peripheral groove 26. This groove 26 is adapted to receive a circular spring member or keeper 27 which is shown in Figure 2 in section, where it is desired that clamping force, in addition to the inherent resiliency of the body material, be applied to the disk to retain it on the rod 9. Also, where the central aperture in the disk 25 has been substantially enlarged by wear, the spring member 27 may be applied thereto to exert additional compression for maintaining close engagement between the disk 25 and the rod 9.

In both of the above described constructions, the continuity of the disk member 25 prevents attachment and/or detachment of the disk 25 and rod 9 after assembly of the rod 9 into the pump. This is no disadvantage where the continuous disk 25 is applied to the pump as original equipment, but where it is desired that replacement thereof shall be made upon excessive wear, then it is preferred to utilize one of the forms illustrated in Figures 3 to 5 inclusive, 7, 9 to 11 inclusive, 13 to 15, 17 or 18.

In the form illustrated in Figures 3, 4, 5 and 7, the washer member 25 is provided with a generally radial slot 28 disposed at an angle to the axis thereof. The resiliency of the body material will permit of the passage of the rod 9 from the outer end of the slot 28 to the central aperture in the disk 25. The spring member 27 at all times urges the adjacent edges of the slot 28 toward one another in such manner as to apply to the washer 25 compressive force urging it securely and in sealing relation against the rod 9.

As may be readily seen from Figure 4, wear, enlarging the central aperture in the disk 25, will be automatically taken up by the inherent resiliency of the body material which is aided by the radial inward pressure exerted by the spring member 27. The form illustrated in Figures 6, 7 and 8 is more nearly spool-shaped than that illustrated in Figures 3, 4 and 5, because the groove 26 is substantially deeper than in those forms.

In Figure 6, the member 25 is illustrated as substituted for the cup leather seal member 15 in the construction illustrated in Figure 2, and the washer member 14 is preferably backed by the member 12a tightly fitted into the bore 12, while the washer member 13 is preferably formed in two or more arcuate portions, or slotted, in order that it may be secured in the groove 26 of the interceptor. The spring member 27 is also secured in the groove 26 in the same manner as in the construction illustrated in Figures 3 to 5 inclusive; and as will be readily understood, this member substantially enhances the seal between the disk 25 and the reciprocatory rod 9. The body 25 is preferably, for ease of attachment and detachment, provided with a slot, as the slot 28 of the construction of Figures 3 to 5, but it is, of course, to be understood that where the member 25 is adapted to be applied to the pump as original or factory equipment, such slot may be omitted.

The construction of the member 25, as illustrated in Figure 8, is the same as that illustrated in Figure 6, but the guide plug 11 is provided with suitable screw threads 12b at the outer end of the bore 12, and the washer member 14 and the member 13 are provided with complementary threads in order that they may be screw-threadedly secured in the plug 11. Figure 7 illustrates the application to the shaft 9 of the construction of interceptor 25 and spring 27 illustrated in Figures 6 and 18.

As above explained, there are cases where the stroke of the rod 9 is greater than the distance between the plug 11 and the stuffing box nut 23. In such cases it is absolutely necessary that there be relative axial movement between the member 25 of the shaft 9 upon each stroke or reciprocation of the shaft 9. Likewise, in some cases, the shaft 9 will be smaller than in other cases. In such cases, it is preferred to use on the rods 9 of differing diameters, body members 25 having central apertures of uniform diameter. In order that sealing engagement shall be maintained between the body 25 and rod 9 in cases where the aperture is of greater diameter than the rod 9 (upon which it is supported), a lug is provided such as a lug 11a on plug 11 in Figure 9 for causing inclination of the body 25 with respect to the shaft 9 at the end of a stroke in either direction. If desired, similar lugs may be formed at opposite sides of the body 25.

As illustrated in Figures 10 and 11, instead of the spring member 27 illustrated in Figures 2 to 9 inclusive, a garter spring 27a may be utilized for the same purpose. Certain advantages of the use of the garter spring 27a over the former type of spring designated 27 are found to exist. For instance, the garter spring 27a extends about the entire annular groove 26 and thus exerts a more nearly uniform radial inward thrust upon the body member 25 to secure a more uniform sealing engagement between the body 25 and the shaft 9.

A second modified form of spring member designated 27b is illustrated in Figures 13 and 14, and this form of spring member comprises a substantially circular flat spring member provided at its opposite ends with spaced upstanding and outwardly directed end portions which greatly facilitate the handling thereof for attachment and detachment to and from the body member 25, and which are spaced radially one from the other.

As shown in Figures 15 and 16, the body member which is therein designated 25a may be made square, or rectangular and provided with a groove 26a similar to the groove 26, but extending about three sides thereof. With this form of body member 25a, a substantially U-shaped spring member 27c is utilized for applying radially inwardly directed compressive force to the body member 25a.

As shown in Figure 17, the body member 25, which is formed in the same manner as in the form illustrated in Figures 3 to 5 inclusive, may have the slot 28 therein disposed axially thereof or in parallelism with the axis of the shaft 9. It is preferred also that the edges of the slot 28 be substantially spaced one from the other by making the central aperture in the body 25 substantially smaller than the shaft 9 upon which it is adapted to be supported. The wear occurring in the body 25 will be automatically taken up by the inherent resiliency of the body 25 which will cause the body 25 to expand inwardly upon wear, whereby the edges of the slot 28 will move toward one another.

As shown in Figure 18, the body member 25 may be formed spirally, in which case it is unnecessary to provide a spring for urging it toward the supporting shaft 9, as the wear will be taken up or compensated for by inward expansion of the body material upon the occurrence of wear.

As above explained, the body member 25 or 25a may be formed of any material suitable for the relation in which the principles of this invention are utilized. It may be formed of leather, of various compositions, of rubber, of synthetic rubber such as "Duprene" or the like, or it may be formed, in the interest of economy, of rubber provided with an exterior coating of oil-resistant synthetic rubber imparting to the interceptor the properties of such a member formed entirely of synthetic rubber, which is far more expensive than rubber.

The disposition of the slot 28 at an angle to the axis of the rod 9 increases the resistance to seepage of the interceptor, while at the same time, in instances where the interceptor is moved axially upon the rod 9 during reciprocation thereof, this groove causes a wiping effect to be exerted in either direction of the movement of the body 25 to successfully prevent the passage of foreign matter on the rod through the slot 28.

It will be understood that the above-described structure is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. In a pump including a reciprocatory piston rod, a seepage interceptor comprising a spool shaped rubber body having a central aperture smaller than the rod and disposed on said rod and resiliently secured thereto by the inherent resiliency of said rubber body, and a radial slot in said body communicating with said aperture and disposed at an angle to the axis thereof whereby said body can be readily forced over said rod and yieldingly fit therearound.

2. In a pump including a reciprocatory piston rod, a seepage interceptor comprising a rubber multiple edge disk body having a central aperture smaller than the rod and disposed on said rod and resiliently secured thereto by the inherent resiliency of said rubber body, a radial slot in said body communicating with said aperture, groove means in the exterior surfaces of said body, and detachable spring means disposed in said groove means for imparting inward radial clamping force to said body to snugly fit said rubber body to said rod.

3. In a seepage interceptor for the reciprocatory rod of a pump, a substantially rectangular resilient body member having a central aperture smaller than said rod and engageable therewith, a slot extending from said central aperture to an edge of said body member, groove means along three sides of said rectangular body member one of which includes said slot means, and a substantially U-shaped spring member engageable in said grooves for applying radially inwardly directed clamping force to said resilient body member to provide a snugly fitting yieldable sealing means.

4. A seepage interceptor for reciprocatory pump shafts and the like, comprising a spool shaped rubber body having a central aperture of smaller diameter than said shaft, said rubber body being disposed on said shaft, and means comprising a radial slot in said body communicating with said aperture for providing ready attachment of said body around said shaft, said body having a peripheral groove and a detachable spring means mounted in said groove adapted to apply radially inwardly directed force to said rubber body to provide an efficient liquid seal between said body and shaft.

5. A seepage interceptor for reciprocatory shafts and the like, comprising a unitary multi-rimmed resilient body having an oil-proof coating of synthetic rubber, said rubber body having a central aperture smaller than said shaft, means comprising a radial slot communicating with said aperture for providing ready attachment of said body around said shaft, and means comprising a yieldable member adapted to be engaged around the periphery of said resilient body for applying radially inwardly directed clamping force to said resilient body member to provide an efficient sealing engagement between said apertured resilient body and the exterior of said reciprocatory shaft.

ARTHUR C. ZIMMERMAN.